United States Patent
Hegde et al.

(10) Patent No.: US 8,983,900 B2
(45) Date of Patent: Mar. 17, 2015

(54) GENERIC SEMANTIC LAYER FOR IN-MEMORY DATABASE REPORTING

(71) Applicants: Sumanth Hegde, Bangalore (IN); Santosh V, Bangalore (IN)

(72) Inventors: Sumanth Hegde, Bangalore (IN); Santosh V, Bangalore (IN)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 13/658,561

(22) Filed: Oct. 23, 2012

(65) Prior Publication Data

US 2014/0114906 A1    Apr. 24, 2014

(51) Int. Cl.
*G06F 17/30* (2006.01)

(52) U.S. Cl.
CPC .............................. *G06F 17/30557* (2013.01)
USPC .......................................................... 707/607

(58) Field of Classification Search
USPC .......................... 707/600, 602, 603, 607, 826
See application file for complete search history.

(56) References Cited

U.S. PATENT DOCUMENTS

| | | | | |
|---|---|---|---|---|
| 7,206,785 B1 * | 4/2007 | Stephens | | 707/602 |
| 8,447,721 B2 * | 5/2013 | Eshleman et al. | | 707/602 |
| 8,510,261 B1 * | 8/2013 | Samantray | | 707/602 |
| 8,650,150 B2 * | 2/2014 | Zhao et al. | | 707/600 |
| 2007/0100842 A1 * | 5/2007 | Wykes et al. | | 707/100 |
| 2009/0157623 A1 * | 6/2009 | Bedi et al. | | 707/3 |
| 2011/0060769 A1 * | 3/2011 | Mohan | | 707/803 |
| 2011/0087954 A1 * | 4/2011 | Dickerman et al. | | 715/219 |
| 2011/0161379 A1 * | 6/2011 | Grund et al. | | 707/812 |
| 2011/0238706 A1 * | 9/2011 | Wong et al. | | 707/802 |
| 2012/0166620 A1 * | 6/2012 | Said et al. | | 709/224 |
| 2012/0173589 A1 * | 7/2012 | Kwon et al. | | 707/803 |
| 2012/0233139 A1 * | 9/2012 | Larson et al. | | 707/703 |
| 2012/0239609 A1 * | 9/2012 | Zhao et al. | | 707/600 |
| 2012/0239612 A1 * | 9/2012 | George et al. | | 707/602 |
| 2013/0073513 A1 * | 3/2013 | Kemper et al. | | 707/600 |
| 2013/0166566 A1 * | 6/2013 | Lemke et al. | | 707/741 |

FOREIGN PATENT DOCUMENTS

WO    WO 2011/144382    11/2011

OTHER PUBLICATIONS

Hasso Plattner, "A Common Database Approach for OLTP and OLAP using an In-Memory Column Database", Jul. 2009, ACM, 7 pages.*

Moser, et al., U.S. Appl. No. 13/593,784, filed Aug. 24, 2012; entitled "Model-Based Backend Service Adaptation of Business Objects" ; 35 pages.

Communication and Notification of European Search Report mailed Mar. 28, 2014 re EPO Application No. 13005056.0-1507; 8 pages.

* cited by examiner

*Primary Examiner* — Cam-Linh Nguyen
(74) *Attorney, Agent, or Firm* — Fish & Richardson P.C.

(57) ABSTRACT

The disclosure generally describes computer-implemented methods, software, and systems for providing a generic semantic layer for in-memory database reporting. One computer-implemented method for combining online transactional processing and online analytical processing in an in-memory database, comprises: retrieving two or more tables from an online transaction processing system; identifying related tables among the two or more tables; determining relationships between the related tables; determining a measure based on the relationships; and outputting the measure.

19 Claims, 5 Drawing Sheets

GENERIC SEMANTIC LAYER FOR IN-MEMORY DATABASE REPORTING

TECHNICAL FIELD

The present disclosure relates to computer-implemented methods, software, and systems for providing a generic semantic layer for in-memory database reporting.

BACKGROUND

In enterprise systems, there are OLTP (OnLine Transaction processing) systems used to carry out business processes of a company where employees and other stakeholders, such as suppliers or customers, follow a business process which may result in business documents created in a database of the OLTP system. In-memory databases thereby exploit recent innovations in hardware to run a database in main memory.

Decision makers may desire to analyze data to make informed decisions. An inability to effectively administer enterprise data often leads to a high total cost of ownership for the enterprise system.

SUMMARY

The present disclosure describes one or more general aspects involving devices, systems and methods for providing a generic semantic layer for in-memory database reporting.

One or more of the following aspects of this disclosure can be embodied alone or in combination as methods that include the corresponding operations. One or more of the following aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following aspects of this disclosure can be implemented alone or in combination on a computer-readable medium having instructions stored thereon that, when executed by a processor, cause the processor to perform operations according to the one or more of the following aspects.

In aspect 1, a system for combining online transactional processing and online analytical processing in an in-memory database, comprises: the in-memory database that is configured to execute a method comprising: retrieving two or more tables from an online transaction processing system; identifying related tables among the two or more tables; determining relationships between the related tables; determining a measure based on the relationships; and outputting the measure.

Aspect 2 according to aspect 1, wherein the tables of the online transaction processing system are replicated in the in-memory database.

Aspect 3 according to any one of aspects 1 to 2, wherein the method further comprises: determining a business object among the tables that identifies a main table among the tables which provides information for linking the related tables.

Aspect 4 according to aspect 3, wherein the business object is a representation of an intelligible business or non-business entity, such as an account, an order, employee, an invoice or a financial report.

Aspect 5 according to any one of aspects 1 to 4, wherein the method further comprises: analyzing metadata of the tables to determine the relationships of the related tables.

Aspect 6 according to any one of aspects 1 to 5, wherein the determining of the measure based on the relationships comprises: identifying the measure in the related tables based on data types of table columns and based on semantic words used in the tables; and calculating the measure using the relationships of the related tables.

Aspect 7 according to any one of aspects 1 to 6, wherein the outputting of the measure comprises: associating the measure with a subset of columns and/or rows from the related tables and outputting the measure with the subset of columns and/or rows.

In aspect 8, a method for combining online transactional processing and online analytical processing in an in-memory database, comprises: retrieving two or more tables from an online transaction processing system; identifying related tables among the two or more tables; determining relationships between the related tables; determining a measure based on the relationships; and outputting the measure.

Aspect 9 according to aspect 8, wherein the tables of the online transaction processing system are replicated in the in-memory database.

Aspect 10 according to any one of aspects 8 to 9, wherein the method further comprises: determining a business object among the tables that identifies a main table among the tables which provides information for linking the related tables.

Aspect 11 according to aspect 10, wherein the business object is a representation of an intelligible business or non-business entity, such as an account, an order, employee, an invoice or a financial report.

Aspect 12 according to any one of aspects 8 to 11, wherein the method further comprises: analyzing metadata of the tables to determine the relationships of the related tables.

Aspect 13 according to any one of aspects 8 to 12, wherein the determining of the measure based on the relationships comprises: identifying the measure in the related tables based on data types of table columns and based on semantic words used in the tables; and calculating the measure using the relationships of the related tables.

Aspect 14 according to any one of aspects 8 to 13, wherein the outputting of the measure comprises: associating the measure with a subset of columns and/or rows from the related tables and outputting the measure with the subset of columns and/or rows.

In aspect 15, a computer-readable medium having computer-executable instructions stored thereon that, when executed by a processor, cause the processor to perform a method for combining online transactional processing and online analytical processing in an in-memory database, comprising: retrieving two or more tables from an online transaction processing; identifying related tables among the two or more tables; determining relationships between the related tables; determining a measure based on the relationships; and outputting the measure.

Aspect 16 according to aspect 15, wherein the tables of the online transaction processing are replicated in the in-memory database.

Aspect 17 according to any one of aspects 15 to 16, wherein the method further comprises: determining a business object among the tables that identifies a main table among the tables which provides information for linking the related tables.

Aspect 18 according to aspect 17, wherein the business object is a representation of an intelligible business or non-business entity, such as an account, an order, employee, an invoice or a financial report.

Aspect 19 according to any one of aspects 15 to 18, wherein the method further comprises: analyzing metadata of the tables to determine the relationships of the related tables.

Aspect 20 according to any one of aspects 15 to 19, wherein the determining of the measure based on the relationships comprises: identifying the measure in the related tables based on data types of table columns and based on semantic words used in the tables; and calculating the measure using the relationships of the related tables.

Aspect 21 according to any one of aspects 15 to 20, wherein the outputting of the measure comprises: associating the measure with a subset of columns and/or rows from the related tables and outputting the measure with the subset of columns and/or rows.

In aspect 22, a system for combining online transactional processing and online analytical processing in an in-memory database comprises: the in-memory database that is configured to execute a method comprising the following actions: retrieving two or more tables from an online transaction processing system, wherein the tables of the online transaction processing system are replicated in the in-memory database; identifying related tables among the two or more tables, the identifying comprising determining a business object among the tables that identifies a main table among the tables which provides information for linking the related tables, and/or analyzing metadata of the tables to identify the related tables; determining relationships between the related tables by analyzing the information and/or the metadata; determining a measure based on the relationships; and associating the measure with a subset of columns and/or rows from the related tables and outputting the measure with the subset of columns and/or rows.

Aspect 23 according to aspect 22, wherein the determining of the measure based on the relationships comprises: identifying the measure in the related tables based on data types of table columns and based on semantic words used in the tables and calculating the measure using the relationships of the related tables.

The subject matter described in this specification can be implemented in particular implementations so as to realize one or more of the following advantages.

First, an analytical layer for OLTP systems is provided that may allow utilizing aggregation capabilities and/or columnar storage capabilities of parallel in-memory database processing.

Second, aggregation of transactional data (e.g., different database tables) and analysis (e.g., calculations) of the aggregated data may be provided.

Third, ultrafast analysis of huge volumes of data in short timeframes may be provided. This may allow real-time decision making, e.g., in enterprise environments.

Fourth, a generic way to interpret semantic relationships between in-memory database tables may be provided.

The details of one or more implementations of the subject matter of this specification are set forth in the accompanying drawings and the description below. Other features, aspects, and advantages of the subject matter will become apparent from the description, the drawings, and the claims.

Reference numbers and designations in the various drawings indicate exemplary aspects, implementations or embodiments of particular features of the present disclosure.

DETAILED DESCRIPTION

The disclosure generally describes computer-implemented methods, software, and systems for providing a generic semantic layer for in-memory database reporting.

Figure 1:
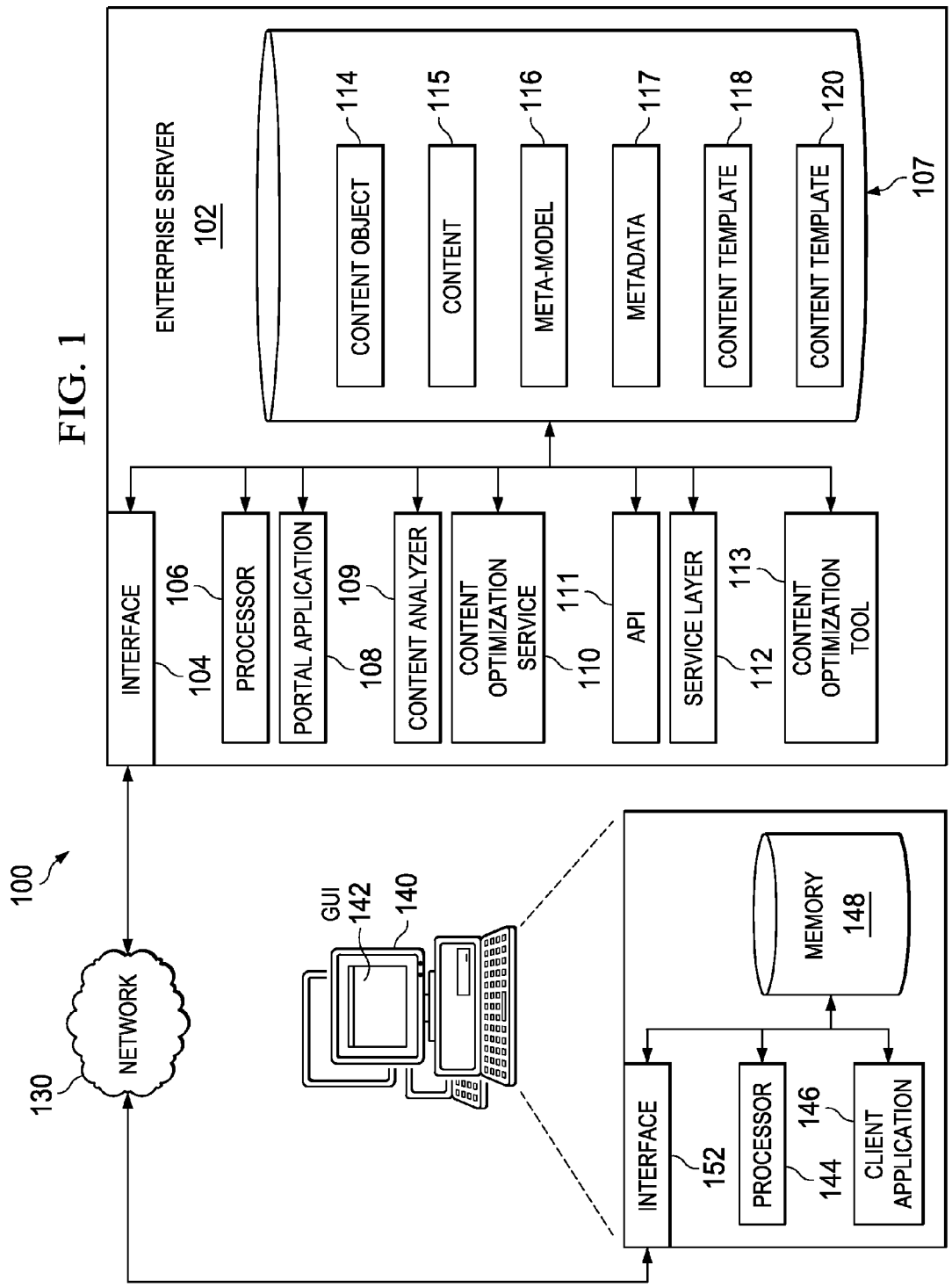
FIG. 1 is a block diagram illustrating an example distributed computing system optimizing enterprise content.

FIG. 1 is a block diagram illustrating an example distributed computing system 100 for optimizing enterprise content. In some implementations, updating enterprise content structures can be automatic. Specifically, the illustrated example distributed computing system 100 includes or is communicably coupled with an enterprise portal server or enterprise server (EPS) 102 and a client 140 that communicate across a network 130.

At a high level, the EPS server 102 is an electronic computing device operable to receive, transmit, process, store, or manage data and information associated with the example distributed computing system 100. At a high level, the enterprise server 102 comprises an electronic computing device operable to receive, transmit, process, store, or manage data and information associated with the example distributed computing system 100. For example, the enterprise server can be part of an enterprise resource planning (ERP) or a customer relationship management (CRM) system.

Generally, the EPS server 102 allows users to compose, modify, delete, and deploy enterprise portal pages. Specifically, the described computer-implemented methods, software, and systems provide functionality for optimizing enterprise content through a graphical user interface (GUI) providing a user with an efficient and user-friendly presentation of data provided by or communicated within the example distributed computing system 100.

The EPS 102 is responsible for receiving application requests, for example enterprise portal navigation requests, from one or more client applications associated with the client 140 of the example distributed computing system 100 and responding to the received requests by processing said requests in the associated portal application or business application 108, and sending the appropriate response from the portal application or business application 108 back to the requesting client application 146. In addition to requests from the client 140, requests associated with the portal applications may also be sent from internal users, external or third-party customers, other automated applications, as well as any other appropriate entities, individuals, systems, or computers. According to one implementation, EPS 102 may also include or be communicably coupled with an e-mail server, a web server, a caching server, a streaming data server, and/or other suitable server.

The EPS 102 contains a business application 108, a content analyzer 109, a content optimization service 110, and a content optimization tool 113 where at least a portion of the business application 108, the content analyzer 109, the content optimization service 110, and the content optimization tool 113 is executed using requests/responses sent from/to a client 140 within and communicably coupled to the illustrated example distributed computing system 100 using network 130. In some implementations, requests/responses can be sent directly to EPS 102 from a user accessing EPS 102 directly. In some implementations, the EPS 102 may store a plurality of various business applications 108, content structure analyzers 109, content optimization service 110, and content optimization tools 113. In some implementations, the EPS 102 may comprise a web server, where one or more of the components of EPS 102 represent web-based applications accessed and executed by the client 140 using the network 130 or directly at the EPS 102 to perform the programmed tasks or operations of the various components of EPS 102.

In some implementations, any and/or all of components of the EPS 102, both hardware and/or software, may interface with each other and/or the interface using an application programming interface (API) 111 and/or a service layer 112. The API 111 may include specifications for routines, data structures, and object classes. The API 111 may be either computer language independent or dependent and refer to a complete interface, a single function, or even a set of APIs. The service layer 112 provides software services to the example distributed computing system 100. The functionality of the EPS 102 may be accessible for all service consumers using this service layer. Software services, such as provide reusable, defined business functionalities through a defined interface. For example, the interface may be software written in extensible markup language (XML) or other suitable language. While illustrated as an integrated component of the EPS 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The EPS 102 includes an interface 104. Although illustrated as a single interface 104 in FIG. 1, two or more interfaces 104 may be used according to particular needs, desires, or particular implementations of the example distributed computing system 100. The interface 104 is used by the EPS 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The EPS 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EPS 102. Specifically, the processor 106 executes the functionality required to optimize enterprise content structures.

The EPS 102 also includes a memory 107 that holds data for the enterprise server 102. Although illustrated as a single memory 107 in FIG. 1, two or more memories may be used according to particular needs, desires, or particular implementations of the example distributed computing system 100. While memory 107 is illustrated as an integral component of the EPS 102, in alternative implementations, memory 107 can be external to the EPS 102 and/or the example distributed computing system 100. In some implementations, the memory 107, i.e., the content repository for the ERP that holds the description and/or data for all objects in the ERP, includes one or more instances of a content object 114, content 115, a meta-model 116, metadata 117, and a content template 118.

The content object 114 can be considered a representation of a business/non-business entity, such as an employee, a sales order, an invoice, a financial report, etc. The content object 114 may encompass both functions, for example in the form of methods, and data, such as one or more properties. For example, content objects 114 may reduce system complexity by reducing a system into smaller units. The implementation details of content objects 114 are typically hidden from a non-development user and may be accessed through the defined functions and encapsulated data. Content objects 114 also form a point of entry of the functions and data of a system and enable the system to easily share, communicate, display, or otherwise operate with other systems. A content object 114 may also be considered the target of a request for data, for example a navigation node in an ERP, a web page, or the final destination of a navigation action, etc. and may contain the view to be displayed when the content object 114 is accessed. In some implementations, the content object 114 can control the location of a selected view, personalized views for a specific enterprise portal user, and dynamic views. Metadata 117 may be used to determine the context of a particular displayed view.

The content 115 is encountered as part of the user experience when accessing a content object 114 within an enterprise portal. The content 115 may include, among other things: text, images, sounds, videos, animations and a data dictionary (DDIC). While illustrated as integrated with memory 107 of the EPS 102 in the example distributed computing system 100, in alternative implementations, the content 115 can be external to the EPS 102 and/or the example distributed computing system 100 or can be internal to the content object 114.

The meta-model 116 is an enterprise content meta-model (EPCMM), a set of definitions that describe basic enterprise portal objects, for example content objects, and relations between the enterprise portal objects. The EPCMM defines at a high-level how content objects in an enterprise portal interact, and also properties of those content objects.

Using the EPCMM, a content model 120 may be created using a set of definitions that extend the EPCMM meta-model definitions and describe the enterprise content objects 114 that derive from the EPCMM meta-model used to represent an organization's structure, content structure, process flow, etc.

While illustrated as integrated with memory 107 of the enterprise server in the example distributed computing system 100, in alternative implementations meta-model 116 can be external to the EPS 102 and/or the example distributed computing system 100. Likewise, while illustrated as integrated with memory 107 of the enterprise server in the example distributed computing system 100, in alternative implementations metadata 117 can be external to the EPS 102 and/or the example distributed computing system 100.

The EPS 102 further includes a content analyzer 109. The content analyzer 109 can perform an analysis of the content repository 107 and identify inconsistencies between the content object 114 and metadata 117 defined for the meta-model 116 applicable to the content object 114. The inconsistency analysis may include any suitable matching and/or comparison method, algorithm, or technique.

The EPS 102 further includes a content optimization service 110. The content optimization service 110 is responsible for updating the content objects 114 in the example distributed computing system 100. In some implementations, the content optimization service 110 receives a set of modification objects which represent the suggested modifications to the content objects 114 to rectify inconsistencies between the content objects 114 and the meta-model 116 identified by the content analyzer 109. In some implementations, the content optimization service 110 also updates a Portal Content Directory (PCD). The PCD is a main repository for ERP content, both delivered with the portal and created by enterprise portal administrators. In some implementations, the PCD can contain a hierarchy of folders, each of which can contain semantic objects, such as iViews, Pages, and Roles. In some implementations, the PCD can be stored in an ERP database and accessed using a PCD Generic Layer (GL), a Java Naming and Directory Interface (JNDI) provider.

The illustrated example distributed computing system 100 also includes a client 140. The client 140 may be any computing device operable to connect to or communicate with at least the EPS 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the EPS 102. Once a particular client application 146 is launched, a user may interactively process a task, event, or other information associated with the EPS 102. Further, although illustrated as a single client application 146, the client application 146 may be implemented as multiple client applications in the client 140. In some implementations, the client application 146 may act as a GUI interface for the content optimization tool 113.

The illustrated client 140 further includes an interface 152, a processor 144, and a memory 148. The interface 152 is used by the client 140 for communicating with other systems in a distributed environment—including within the example distributed computing system 100—connected to the network 130; for example, the EPS 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the EPS 102 or other processors within the example distributed computing system 100. Specifically, the processor 144 executes instructions and manipulates data to perform the operations of the client 140, including the functionality required to send requests to the EPS 102 and to receive and process responses from the EPS 102. The memory 148 may be consistent with the above-described memory 107 of the EPS 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the EPS 102. In particular, the GUI 142 may be used to perform functions optimizing enterprise content.

There may be any number of clients 140 associated with, or external to, the example distributed computing system 100. For example, while the illustrated example distributed computing system 100 includes one client 140 communicably coupled to the EPS 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, cell phone, personal data assistant (PDA), tablet computing device, e-book reader, one or more processors within these devices, or any other suitable processing device. For example, the client 140 may comprise a computer that includes an input device, such as a keypad, touch screen, or other device that can accept user information, and an output device that conveys information associated with the operation of the EPS 102 or the client 140 itself, including digital data, visual information, or a GUI 142, as shown with respect to the client 140.

Figure 2:
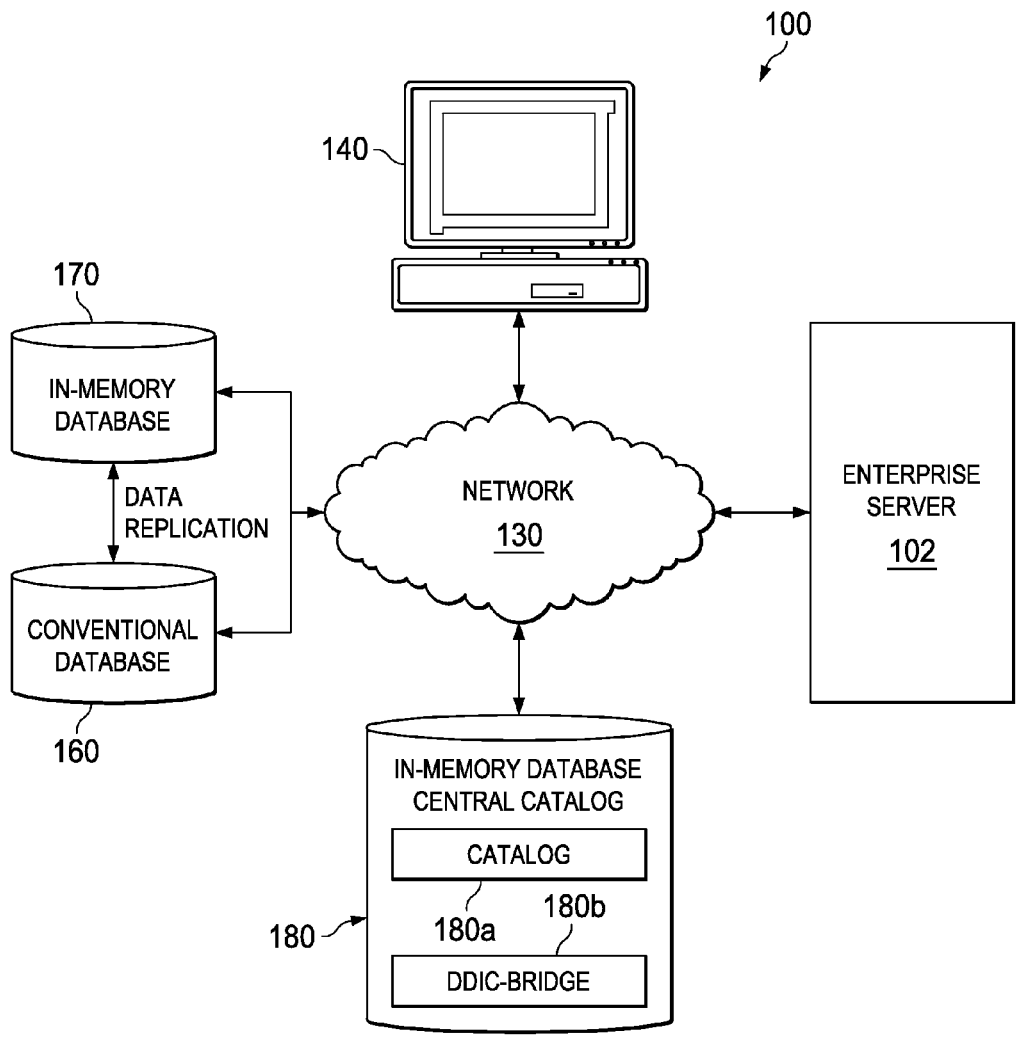
FIG. 2 illustrates an example augmented distributed computing system for providing a generic data model based on in-memory database views.

FIG. 2 further illustrates an example augmented distributed computing system 100 operable to provide a generic data model based on in-memory database views. Specifically, the illustrated example distributed computing system 100 includes or is communicably coupled with the enterprise server 102, the client 140, and a conventional database 160, an in-memory database 170, and an in-memory database central catalog 180 that communicate across the network 130. At a high level, the enterprise server 102 comprises an electronic computing device operable to receive, transmit, process, store, or manage data and information associated with the example augmented distributed computing system 100. For example, the enterprise server can be part of an enterprise resource planning (ERP) or a customer relationship management (CRM) system. At a high level, the enterprise server 102 provides business application or other services in an organization's system landscape. Generally, through a graphical user interface (GUI), a user, for example a client 140 is provided with an efficient and user-friendly presentation of data provided by or communicated within the example distributed computing system 100 and the ability to perform operations within the example distributed computing system 100.

In general, in-memory databases utilize recent innovations in hardware to run an entire database in main memory. In an aspect, in-memory database may be used as sole analytical system, where full aggregation capabilities and columnar storage capabilities of in-memory data processing may be utilized to provide ultrafast analytics to analyze huge volumes of data in extremely short time frames in order to enable real-time decision making. In a general aspect, in-memory database may be used as underlying database for other systems (e.g., OnLine Analytical Processing, OLAP) systems to speed up data access and aggregations. In a general aspect, in-memory database may be used as secondary database of an OLTP system to speed up intensive operations in OLTP.

In some implementations, the in-memory database 170 is used as a primary database to the enterprise server 102. In this implementation, the client 140 interfaces with the in-memory database 170 and with the in-memory database central catalog 180. This implementations allows for the direct analytical access to the data stored in the enterprise server 102 using analytical tools working with the in-memory database 170. In this scenario the full aggregation capabilities and columnar storage capabilities of the in-memory database may be utilized to provide fast analytics of data. In other implementations, the in-memory database 170 is used as a secondary database side-by-side with a conventional database 160 that interfaces with the enterprise server 102. In this implementation, the client 140 interfaces with the conventional database 160, the in-memory database 170, and the in-memory database central catalog 180. The data and/or metadata needed for analytical operations is replicated (e.g., copied as they are without a change) in real-time or near real-time to the in-memory database 170. The analytical applications or layers are executed against the in-memory database 170 and the existing data for the enterprise server 102 on the conventional database 160 is not affected. As will be appreciated by those skilled in the art, other configurations of the enterprise server 102, client 140, conventional database 160, in-memory database 170, and in-memory database central catalog 180 are possible without departing from the scope of this disclosure.

The example distributed computing system 100 includes a conventional database 160 containing data applicable to, in some implementations, a business application associated with the enterprise server 102. The conventional database 160 primarily relies on non-volatile magnetic, optical, removable, or other suitable non-electronic memory, for storage, retrieval, and processing of data. Although illustrated as a stand-alone component of the example distributed computing system 100, conventional database 160 may be integrated wholly or in part with any other component of the example distributed computing system 100. The conventional database 160 may also take the form of a physical and/or virtual database.

The example distributed computing system 100 also includes an in-memory database 170. The in-memory database 170 is a high-performance (e.g. via parallel processing) database management system (DBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database. In some implementations, the in-memory database 170 can be replicated to the conventional database 160 for backup purposes. In some implementations, data from the conventional database 160 can be replicated to and used from the in-memory database 170.

As illustrated in FIG. 1, the enterprise server 102 includes an interface 104. Although illustrated as a single interface 104 in FIG. 1, two or more interfaces 104 may be used according to particular needs, desires, or particular implementations of the example distributed computing system 100. The interface 104 is used by the enterprise server 102 for communicating with other systems in a distributed environment—including within the example distributed computing system 100—connected to the network 130; for example, the client 140, the conventional database 160, the in-memory database 170, and/or the DCC 180, as well as other possible systems/components that may be communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the enterprise server 102 includes a processor 106. Specifically, the processor 106 executes the functionality required to receive and respond to requests from, for example, the client 140, the databases 160, 170, 180 and/or other possible systems/components that may be communicably coupled to the network 130 (not illustrated), and to execute the business application 108 and/or central catalog service 110 functionality.

As illustrated in FIG. 1, the enterprise server 102 also includes a memory 107 that holds data for the enterprise server 102. In some implementations, the memory 107 includes business application data 114 and a data dictionary (DDIC) 115. Although illustrated as single instances, there may be more than one instance of the business application data 114 and the DDIC 115.

The data dictionary 115 is a central, non-redundant, logical description/definition of all data objects used within systems/components of example distributed computing system 100, for example, the conventional database 160 and/or the in-memory database 170. Example data objects stored within the data dictionary 115 includes, for example, domains, data elements, and/or database table fields. For example, the data dictionary 115 shows how the data objects are mapped to an underlying relational database in tables or views which store business application data 114. New or modified data objects within the data dictionary 115 are available to all components associated with the systems/components of example distributed computing system 100. The data dictionary 115 also provides standard editing functions for editing data objects within the data dictionary 115. The DDIC 115 may be wholly or partially stored on the conventional database 160, the in-memory database 170, the enterprise server 102 and/or the client 140.

As illustrated in FIG. 1, at least one business application 108 is illustrated within the enterprise server 102. The business application 108 can be any application, program, module, process, or other software that may execute, change, delete, generate, or otherwise manage information associated with a particular enterprise server 102, and in some cases, a business process performing and executing business process-related events. In particular, business processes communicate with other users, applications, systems, and components to send and receive events. In some implementations, a particular business application 108 can operate in response to and in connection with at least one request received from an associated client 140. Additionally, a particular business application 108 may operate in response to and in connection with at least one request received from other business applications 108, including a business application 108 associated with another enterprise server 102 (not illustrated). In some implementations, each business application 108 can represent a Web-based application accessed and executed by remote clients 140 via the network 130 (e.g., through the Internet, or via at least one cloud-based service associated with the business application 108). For example, a portion of a particular business application 108 may be a Web service associated with the business application 108 that is remotely called, while another portion of the business application 108 may be an interface object or agent bundled for processing at a remote client 140. Moreover, any or all of a particular business application 108 may be a child or sub-module of another software module or enterprise application (not illustrated) without departing from the scope of this disclosure. Still further, portions of the particular business application 108 may be executed or accessed by a user working directly at the enterprise server 102, as well as remotely at a corresponding client 140. In some implementations, the enterprise server 102 can execute the business application 108.

Business application data 114 is any type of data associated with a data object used by the business application 108. For example, for a business application 108 that processes sales invoices, business application data 114 for a specific sales invoice data object may include data pertaining to a particular sales invoice number, buyer, seller, date, address, product(s), quantity, price, tax rate, etc. Although illustrated as stored on enterprise server 102, in other implementations, the business application data 114 may be wholly or partially stored on the conventional database 160, the in-memory database 170, and/or the client 140.

The service layer 112 provides software services to the enterprise server 102 and the example distributed computing system 100. The functionality of the enterprise server 102 may be accessible for all service consumers via this service layer. Software services, such as a central catalog service 110, provide reusable, defined business functionalities through a defined service interface. For example, the service interface may be software written in extensible markup language (XML) or other suitable language. While illustrated as an integrated component of the enterprise server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

As illustrated in FIG. 2, the example distributed computing system 100 includes an in-memory database central catalog (DCC) 180. In some implementations, the DCC 180 contains a catalog 180a database table and a data dictionary (DDIC)-bridge 180b database table. In other implementations, the catalog 180a and the DDIC-bridge 180b are combined. In some implementations, there is a only single DCC 180 in the example distributed computing system 100 communicably coupled to other components of the example distributed computing system 100 using network 130. The catalog 180a contains application view fields and ensures consistent and reusable naming for the application view fields. For example, a catalog 180a application view field entry for "EmployeeID" may be used in multiple application views to refer to the same application view field name as well as being easy understandable. In some implementations, entries in the catalog 180a and/or the DDIC-bridge 180b can be created, modified, and/or deleted by experts with a semantic understanding of a business application. These entries can then be appropriately used by the method described in FIG. 4 below.

The DDIC-bridge 180b links all entries in the catalog, for example "EmployeeID" to actual database entities, for example an "EmpID" database column name. The DDIC-bridge 180b may contain, among other data values, links to database domains, data elements, and/or database table fields available on the in-memory database 170. The DDIC-bridge 180b provides data necessary to ensure non-duplicative naming of all application view field names.

A view field naming application/service is provided to analyze the underlying database entity characteristics that an application view field is based on, the catalog 180a, and the DDIC-bridge 180b data values associated with particular catalog 180a entries to propose an external name to use with the application view field. For example, assuming a database table with a column name of "Pers" that is known to contain the last name of a person, it is necessary to check whether an entry in the catalog 180a already is mapped to this actual column name. At a high-level, it is difficult without actual knowledge to know how to search the catalog 180a to determine whether there is already an appropriate entry for this column name. For example, a catalog 180a entry for "Person" may not represent the last name of a person, but instead an identification number issued by the country of residence.

As application view field names in the catalog 180a are typically derived from corresponding database table field names, this relationship between the catalog 180a entry and the actual database table field name provides a link, the DDIC-bridge 180b, between the catalog 180a entry and the underlying database domains, data elements, and/or database table fields.

Figure 3:
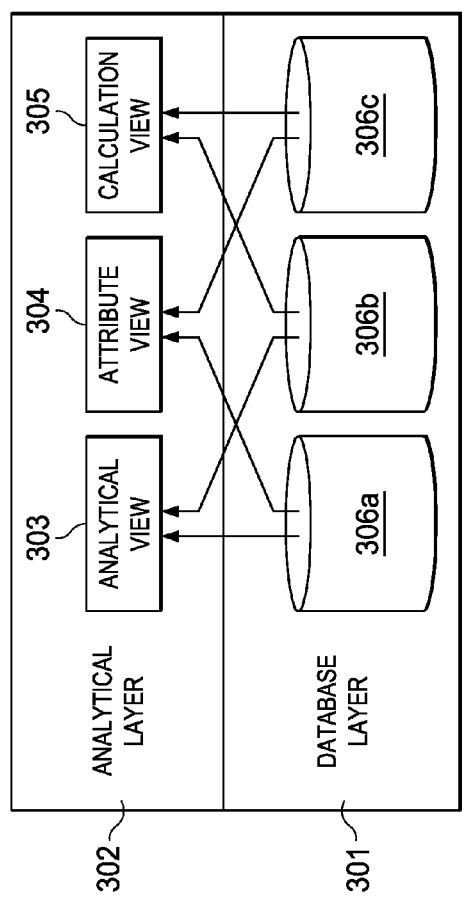
FIG. 3 illustrates an exemplary schematic representation of an analytical layer constructed on top of database tables.

Turning now to FIG. 3. FIG. 3 illustrates an exemplary schematic representation of an analytical layer constructed on top of database tables. FIG. 3 illustrates an exemplary analytical layer 302 above (e.g., on top of) an in-memory database layer 301 to represent semantic relationships between database tables in the database layer 301. This analytical layer 302 may comprise at least one of the objects 303-305 Attribute View 304, Analytic View 303 and Calculation View 305. In an aspect, the Attribute View 304 may give context to and selects a subset of columns and/or rows from the database tables of the database layer 301. In an aspect, the Analytic View 303 may be used for calculation and/or aggregation of data (e.g., in a star-schema) by adding transactional data from an OLTP system and/or by performing calculations (e.g., a number of products sold per year) whose one or more results may be outputted. For example, the Analytic View 303 may comprise at least one calculation or measure which may be outputted. In an aspect, the Calculation View 305 may perform complex calculations that are not performable with the other objects 303, 304, e.g., by using SQLScript. For example, the Calculation View may comprise at least one calculation or measure which may be outputted.

In a general aspect, the database layer 301 may be implemented in-memory. In an aspect the database layer 301 may comprise two or more database tables 306a-c that are replications (e.g., true copies) of OLTP database tables while maintaining data and/or metadata of the OLTP database tables. The replicated database tables 306a-c may be provided as traditional row storage or as optimized column storage database tables. In an aspect, analytical models may be constructed to represent relationships between the database tables 306a-c in the database layer 301.

Figure 4:
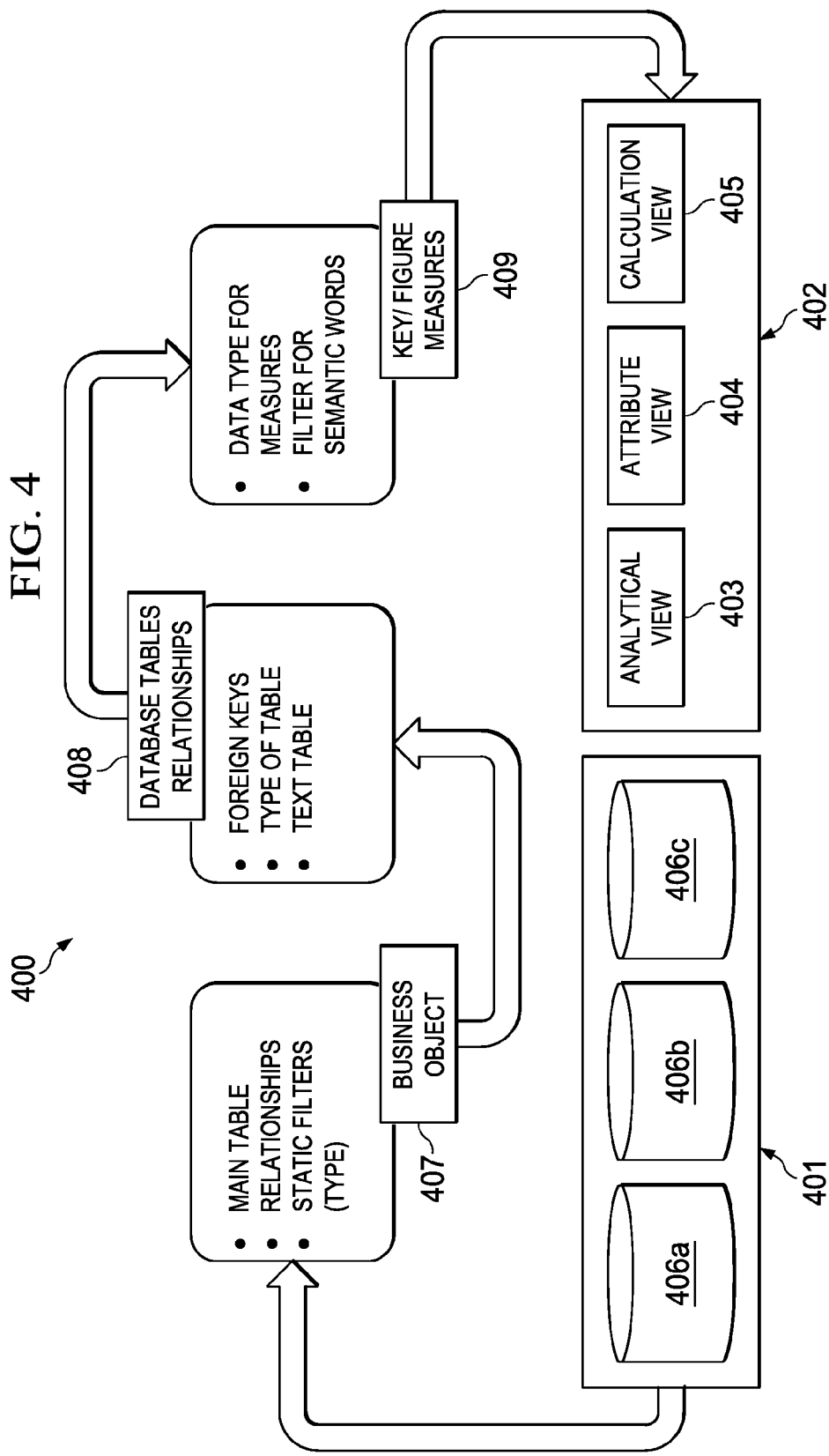
FIG. 4 illustrates an exemplary process flow for providing a generic semantic layer for in-memory database reporting.

In an aspect, there may be multiple information sources (e.g., three main sources) for the analytical models in the analytical layer 302, 402 as illustrated in FIG. 4.

FIG. 4 illustrates an exemplary process flow 400 for providing a generic semantic layer 402 for in-memory database reporting. In this example, one or more of the objects Analytical View 403, Attribute View 404 and Calculation View 405 may be generated in the generic semantic layer (e.g., the analytical layer 402) as one or more outputs. In a general aspect, FIG. 4 illustrates a method for combining online transactional processing and online analytical processing in an in-memory database, comprising: retrieving two or more tables from an online transaction processing system; identifying related tables among the two or more tables; determining relationships between the related tables; determining a measure based on the relationships; and outputting the measure. This may provide an analytical layer for OLTP systems that may allow utilizing aggregation capabilities and/or columnar storage capabilities of parallel in-memory database processing.

In an aspect, the tables 406*a-c* of the online transaction processing system may be replicated (e.g., truly copied from the original tables) in the in-memory database. One or more of the following three main information sources may be utilized to provide one or more of the advantages described herein.

First, an underlying framework of the database tables 406*a-c* may have one or more relationships (e.g., certain types of connections and/or dependencies) between the database tables 406*a-c* defined. In an aspect, the method further comprises: determining a business object 407 (BO) among the tables 406*a-c* that identifies a main table among the tables 406*a-c* which provides information for linking the related tables. In an implementation, the business object 407 may be a representation of an intelligible business or non-business entity, such as an account, an order, employee, an invoice or a financial report.

In an aspect, a business object 407 may be identified representing a main table among the database tables 406*a-c* that connects different database tables 406*a-c*. This aspect may provide an identification of related tables 406 from the business object 407 and may represent a business object model.

In some implementations, the memory 107 of the enterprise server 102 illustrated in FIGS. 1,2 may include a business object 407, business object model, and business object model data. Although illustrated as single instances, there may be more than one instance of the business object, business object model, and business object model data.

The business object 407 (BO) can be considered a representation of an intelligible business/non-business entity, such as an account, an order, employee, an invoice, a financial report, etc. The business object 407 may encompass both functions, for example in the form of methods, and data, such as one or more properties. For example, an account business object may have properties such as Name, Priority, Value, etc. Business objects 407 may reduce system complexity by reducing a system into smaller units. The implementation details of business objects are typically hidden from a non-development user and may be accessed through the defined functions and encapsulated data. Business objects 407 also form a point of entry of the functions and data of a system and enable the system to easily share, communicate, display, or otherwise operate with other systems. A business object 407 may also be considered the target of a request for data in a particular business suite, for example through a web page, and may contain a view to be displayed when the business object 407 is accessed. In some implementations, the business object 407 can control the location of a selected view, personalized views for a specific business suite user, and dynamic views. While being integrable with memory 107 of the enterprise server 102 in the example distributed computing system 100, in alternative implementations the business object can be stored external to the business suite server 102, e.g., in the in-memory database 170 or in the conventional database 160 (e.g., within the client 140 or the network 130).

The business object model is a structured way of representing relationships, associations, roles, etc. of business objects applicable to an organization. For example, the business object model may be represented through the use of an entity-relationship diagram (ERD) or other suitable diagram or descriptive method. An example a business object model for ProductSeller may include root business objects such as Account and Order, each of which may contain their own methods, properties, and relationships to other dependent objects in the business object model. The root business objects may also have associations with other dependent business objects. Examples of a dependent object for the Account root business object may include AccountAddressUS. Example dependent objects for the Order rood business object 114 may include OrderPartner and OrderItemShipmentData. While being integrable with memory 107 of the enterprise server 102 in the example distributed computing system 100, in alternative implementations the business object model can be stored external to the business suite server 102, e.g., in the in-memory database 170 or in the conventional database 160 (e.g., within the client 140 or the network 130).

The business object model data is data associated with a specific instance of a business object. For example, for the example AccountAddressUS dependent object above, there may be properties Name, Title, Address1, Address2, City, State, and PostalCode. Business object data would be the data associated with each property, for example, Name="XYZ, Inc.", Address1="12345 Any Street", Address2="Suite ABC", City="Some City", etc. In some implementations, the business object model data may include, among other things: text, images, sounds, videos, and animations. While being integrable with memory 107 of the enterprise server 102 in the example distributed computing system 100, in alternative implementations the business object model data can be stored external to the business suite server 102, e.g., in the in-memory database 170 or in the conventional database 160 (e.g., within the client 140 or the network 130).

Second, one or more relationships 408 between the database tables 406*a-c* of the database layer 401 may be determined in addition to (e.g. subsequently and/or in series with) the identification of business objects 407. In an aspect, the relationships determined by the identified business object 407 may be augmented by additional relationships determined by analyzing the tables 406*a-c*. In an aspect, the one or more relationships 408 between the database tables 406*a-c* may be determined by analyzing metadata of the tables 406*a-c* (e.g., especially if there is no business object 407 identified). The metadata may originate from method (e.g., application) development and may be defined at design time by developers of the method described in context of FIG. 4.

In an aspect, foreign keys may point to related tables, e.g. foreign keys may connect two or more tables 406*a-c*. In an aspect, the foreign keys may be entries in the tables 406*a-c* that are configured to connect two or more tables among the database tables 406*a-c*. In an aspect, the foreign keys may be one or more entries in the table 406*a-c* that are configured to point to, and/or define the relationship with, another one or more tables 406*a-c* among the database tables 406*a-c*. In an aspect foreign keys may be a part of the metadata and may identify if there are any key or non-key relationships between any two or more tables 406*a-c* among the database tables 406*a-c* in the database layer 401. In an aspect, the metadata contained in the tables 406*a-c* may indicate, e.g. together with the business object 407, a type of a table 406*a-c*, e.g. that a table 406*a-c* among the database tables 406*a-c* represents a master table or a transactional table within the database tables 406*a-c* in the database layer 401. For example, this may determine that a relationship 408 between the tables 406*a-c* is a text table.

As stated in context of FIG. 2 above, the DDIC-bridge 180*b* may contain, among other data values, links to database domains, data elements, and/or database table fields available on the in-memory database 170. In an aspect, the domains used for modeling the data elements may be used to determine (e.g., interpret) the relationships between the tables 406*a-c*. In case the same domain is being used for multiple data elements, then the data elements may be connected as being related. In an aspect, a type of domain that qualify for discovering the relationships between the tables 406*a-c* may be identified by the method described in FIG. 4. In an implementation, domains comprising fixed values and/or a check table may be best qualified for related data elements.

Third, one or more measures 409 (e.g., key figures, indicators or calculations) may be determined. In the method described in context of FIG. 4, the determining of the measure 409 based on the relationships may comprise: identifying the measure in the related tables (among the database tables 406*a-c*) based on data types of table columns and based on semantic words used in the tables; and calculating the measure using the relationships 408 of the related tables 406*a-c*. In an aspect, the data types and/or the semantic words in columns of the related tables 406*a-c* in the database layer 401 may be used to automatically determine the measure 409 (e.g., key figures). In an implementation, the data types may be one or more of quantity, amount, numeric, decimal, integer and alphanumeric. In an aspect, the semantic words (e.g., such as average, sum, difference, deviation, probability, estimated, total or list) within the related tables (e.g., words located in columns of the related tables) may be understood, identified and/or filtered by a semantic layer generator to describe the data type (e.g. the type of data located in the columns of the related tables) and/or an aggregation type used for the outputting of the measure 409. The data type may be used for the outputting of the measure 409, e.g. for generating one or more of the Analytical View 403, the Attribute View 404 and the Calculation View 405. In an aspect, document (e.g., table) identifiers may be used as attributes or characteristics, which may not be able to be aggregated.

In an aspect, the outputting of the measure 409 may comprise: associating the measure 409 with a subset of columns and/or rows from the related tables and outputting the measure 409 with the subset of columns and/or rows. In an implementation, Attribute View 404 may output one or more of product quantities, order identifiers, order item identifiers, material identifiers and material description, and Analytical View may output measures (e.g. calculations) derived for the product, order and/or material. The aspects and/or implementations described in context of FIG. 4 may provide aggregation of transactional data (e.g., different database tables) and analysis (e.g., calculations) of the aggregated data. One or more of the aspects and/or implementations described in context of FIG. 4 may provide ultrafast analysis of huge volumes of data in short timeframes. This may allow real-time decision making, e.g., in enterprise environments.

Figure 5:
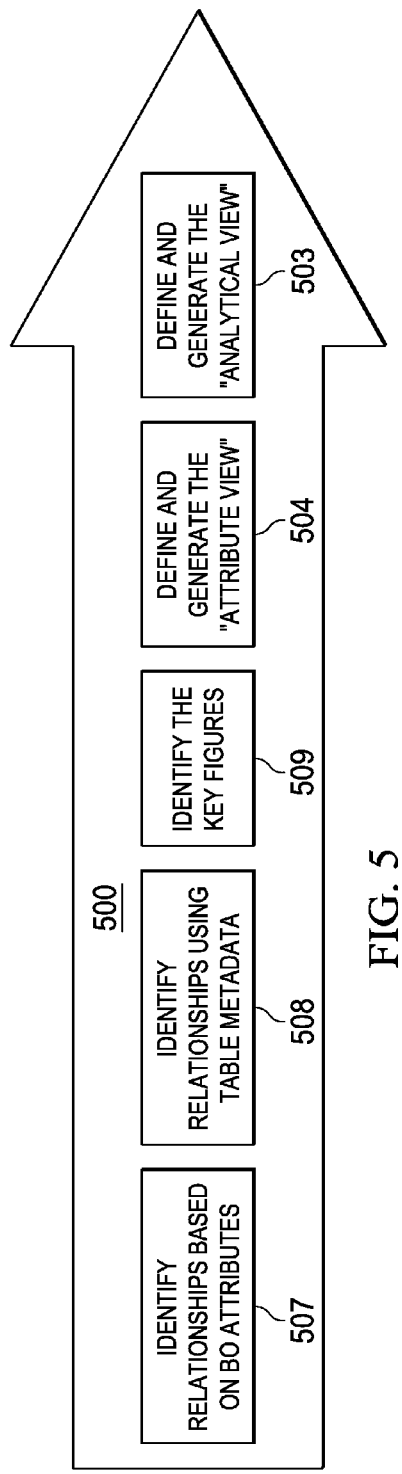
FIG. 5 illustrates an exemplary overview of the exemplary process flow shown in FIG. 4.

FIG. 5 illustrates an exemplary overview 500 of the exemplary process flow shown in FIG. 4. In an aspect, a system or method for combining online transactional processing and online analytical processing in an in-memory database is described that comprises: the in-memory database that is configured to execute a method comprising the following operations: retrieving two or more tables from an online transaction processing system, wherein the tables of the online transaction processing system are replicated in the in-memory database; identifying related tables among the two or more tables comprises determining 507 a business object among the tables that identifies a main table among the tables which provides information for linking the related tables and/or analyzing metadata of the tables to identify the related tables; determining 508 relationships between the related tables by analyzing the information and/or the metadata; determining 509 one or more measures (e.g., one or more key figures) based on the relationships; and associating 504 the measure with a subset of columns and/or rows from the related tables and outputting 503 the measure with the subset of columns and/or rows. In an aspect, the determining 509 of the measure based on the relationships comprises: identifying the measure in the related tables based on data types of table columns and based on semantic words used in the tables, and further comprises calculating the measure using the relationships of the related tables. One or more aspects and/or implementations described in context of FIGS. 4 and/or 5 may provide a generic way to interpret semantic relationships between in-memory database tables.

In an implementation, the relationships between the tables may be identified 507 based on attributes of business objects. This may be followed by identifying 508 additional relationships by analyzing the metadata of the tables. This may further be followed by identifying 509 the measure (e.g. key figure) in the related tables based on the data types and the semantic words. This may followed by defining and generating 504 the Attribute View and/or defining and generating 503 the Analytical View. The process steps illustrated in FIGS. 4,5 may be executed in a series and/or in parallel.

Figure 6:
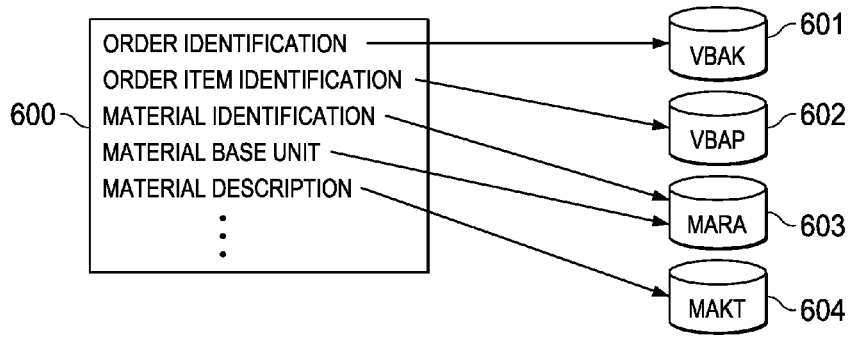
FIG. 6 illustrates and exemplary Attribute View.
Figure 7:
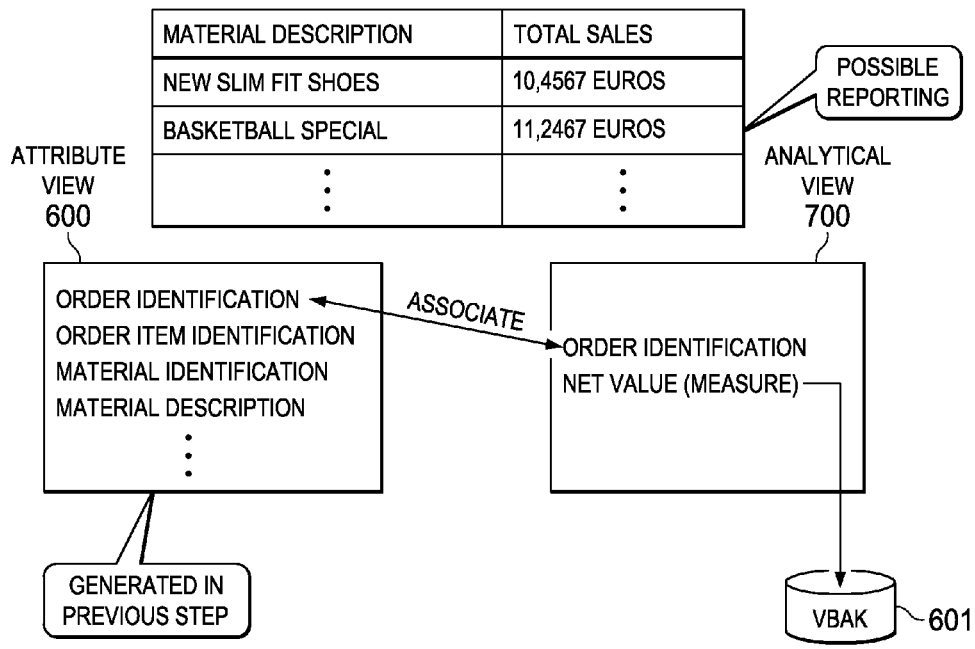
FIG. 7 illustrates an exemplary Analytical View together with an associated Attribute View.

FIG. 6 illustrates and exemplary Attribute View 600 and FIG. 7 illustrates an exemplary Analytical View together with an associated exemplary Attribute View.

In FIG. 6, a sales order business object may show that the main table 601 is VBAK. The main table 601 VBAK may provide an order identifier and the sales order business object may be related to a material business object for items sold in the sales order business object. The main table 601 may be related to a table called VBAP 602 which provides identifiers of order items. In this example of FIG. 6, a table called MARA 603 may comprise data about material identifiers and material base units, and the table MARA 603 may have MAKT as the text table 604 which may provide descriptions that may be included in the Attribute View 600. For example, the text table MAKT 604 may comprise material descriptions.

In FIG. 7, the main table 601 VBAK is analyzed for measures (e.g., key figures). In this example of FIG. 7, the measure net value of the sales order (e.g., in currency amount) is determined. In this example, the measure is associated with a subset of rows from the related tables as indicated in the Attribute View 600 and the measure is outputted with the subset of rows in the Analytical View 700. The Analytical View 700 comprising the measure may be constructed and may be associated with the Attribute View 600.

In some aspects, implementations or embodiments, the subject matter of this disclosure may be applied to collaborative pages, workspaces, and other suitable environments. Enterprise Workspace (EWS) technology leverages existing ERP capabilities and acts as an "add-on" to ERP technology. For example, EWS user interface (UI) technology may run on top of existing ERP technology. EWS functionality provides a flexible, intuitive environment for single EWS users and/or teams or groups of EWS users to create, integrate, organize, compose, modify, and delete, through the use of modules, both structured and unstructured content on EWS pages within an EWS. EWS technology allows EWS users to take advantage of a "self-service," that is a decentralized, approach in assembling content on EWS pages, often without involvement by an enterprise's information technology group.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A system for combining online transactional processing and online analytical processing in an in-memory database, comprising:
   the in-memory database that is configured to execute a method comprising:
   retrieving two or more tables from an online transaction processing system;
   identifying related tables among the two or more tables;
   determining, by a hardware processor, relationships between the related tables, wherein determining the relationships comprises analyzing metadata of the related tables;
   determining a measure based on the relationships; and
   outputting the measure.

2. The system of claim 1, wherein the tables of the online transaction processing system are replicated in the in-memory database.

3. The system of claim 1, wherein the method further comprises:
   determining a business object among the tables that identifies a main table among the tables which provides information for linking the related tables.

4. The system of claim 3, wherein the business object is a representation of an intelligible business or non-business entity, such as an account, an order, employee, an invoice or a financial report.

5. The system of claim 1, wherein the determining of the measure based on the relationships comprises:
   identifying the measure in the related tables based on data types of table columns and based on semantic words used in the tables; and
   calculating the measure using the relationships of the related tables.

6. The system of claim 1, wherein the outputting of the measure comprises:
   associating the measure with a subset of columns and/or rows from the related tables and outputting the measure with the subset of columns and/or rows.

7. A method for combining online transactional processing and online analytical processing in an in-memory database, comprising:

retrieving two or more tables from an online transaction processing system;

identifying related tables among the two or more tables;

determining, by a hardware processor, relationships between the related tables, wherein determining the relationships comprises analyzing metadata of the related tables;

determining a measure based on the relationships; and outputting the measure.

8. The method of claim 7, wherein the tables of the online transaction processing system are replicated in the in-memory database.

9. The method of claim 7, wherein the method further comprises:

determining a business object among the tables that identifies a main table among the tables which provides information for linking the related tables.

10. The method of claim 9, wherein the business object is a representation of an intelligible business or non-business entity, such as an account, an order, employee, an invoice or a financial report.

11. The method of claim 7, wherein the determining of the measure based on the relationships comprises:

identifying the measure in the related tables based on data types of table columns and based on semantic words used in the tables; and calculating the measure using the relationships of the related tables.

12. The method of claim 7, wherein the outputting of the measure comprises:

associating the measure with a subset of columns and/or rows from the related tables and outputting the measure with the subset of columns and/or rows.

13. A non-transitory computer-readable medium having computer-executable instructions stored thereon that, when executed by a processor, cause the processor to perform a method for combining online transactional processing and online analytical processing in an in-memory database, comprising:

retrieving two or more tables from an online transaction processing;

identifying related tables among the two or more tables;

determining relationships between the related tables, wherein determining the relationships comprises analyzing metadata of the related tables;

determining a measure based on the relationships; and outputting the measure.

14. The non-transitory computer-readable medium of claim 13, wherein the tables of the online transaction processing are replicated in the in-memory database.

15. The non-transitory computer-readable medium of claim 13, wherein the method further comprises:

determining a business object among the tables that identifies a main table among the tables which provides information for linking the related tables.

16. The non-transitory computer-readable medium of claim 15, wherein the business object is a representation of an intelligible business or non-business entity, such as an account, an order, employee, an invoice or a financial report.

17. The non-transitory computer-readable medium of claim 13, wherein the determining of the measure based on the relationships comprises:

identifying the measure in the related tables based on data types of table columns and based on semantic words used in the tables; and calculating the measure using the relationships of the related tables.

18. The non-transitory computer-readable medium of claim 13, wherein the outputting of the measure comprises:

associating the measure with a subset of columns and/or rows from the related tables and outputting the measure with the subset of columns and/or rows.

19. A system for combining online transactional processing and online analytical processing in an in-memory database, comprising:

the in-memory database that is configured to execute a method comprising:

retrieving two or more tables from an online transaction processing system, wherein the tables of the online transaction processing system are replicated in the in-memory database;

identifying related tables among the two or more tables, comprising:

determining a business object among the tables that identifies a main table among the tables which provides information for linking the related tables;

analyzing metadata of the tables to identify the related tables;

determining, by a hardware processor, relationships between the related tables by analyzing the metadata of the tables;

determining a measure based on the relationships; and associating the measure with a subset of columns and/or rows from the related tables and outputting the measure with the subset of columns and/or rows.

* * * * *